United States Patent Office 2,917,474
Patented Dec. 15, 1959

2,917,474

PROCESS FOR PRODUCING ACRYLONITRILE COPOLYMERS CONTAINING FREE AMINE GROUPS, A COPOLYMER OBTAINED THEREBY, AND TEXTILE MATERIAL CONTAINING FIBERS OF SAID COPOLYMER

James Wotherspoon Fisher, Ernest Jan Kowolik, and Cyril Walter Stone, Spondon, near Derby, England, assignors to British Celanese Limited, a corporation of Great Britain No Drawing. Application May 24, 1955
Serial No. 510,831

Claims priority, application Great Britain June 1, 1954

5 Claims. (Cl. 260—8)

This invention relates to polymers and especially to polymers containing nitro-alkylene groups.

We have prepared film-forming polymers containing as repeating units cyanoalkylene groups (especially cyanoethylene) and amino-alkylene groups (especially amino-ethylene), by copolymerising an unsaturated nitrile with a nitroalkene and reducing the resulting copolymer. By a film-forming polymer is meant what is commonly called a high polymer i.e. one of sufficiently high average molecular weight to be capable of forming self-supporting films.

The unreduced polymers containing nitroalkylene groups are believed to be novel in themselves and form part of the present invention.

As is well known fibres can be formed from polyacrylonitrile which are particularly valuable on account of their high tenacity, heat softening point, and resistance to water and most organic liquids, but which have the serious disadvantage of extremely poor dye receptivity. One of the objects of the present invention is to provide a method of making polymers combining the advantages of polyacrylonitrile with good affinity for acid and direct cotton dyes. We have obtained excellent affinity combined with good fibre-forming properties by reducing nitro groups in copolymers of acrylonitrile with a small molar proportion of nitroethylene. The preferred polymers of the invention contain a major molar proportion of acrylonitrile, i.e. over 50% and preferably over 80% or even higher, e.g. 95%.

Suitable nitroalkenes for employment in the invention comprise nitroethylene, 1-nitropropene, 2-nitropropene, 2-nitrobutene-1, 1-nitroisobutene-1, 1-nitroamylene-1, 1-nitrooctylene-1. The best results so far obtained have been with nitroethylene. A mixture of two or more nitroalkenes may also be employed, e.g. a mixture of nitroethylene and a nitropropene.

We have found that when copolymers of lower aliphatic unsaturated nitriles and lower aliphatic nitroalkenes are subjected to reduction that not only the nitro groups but also that some cyano groups may undergo reduction. Thus the reduced polymer may contain among the repeating structural units of the molecules, cyano-alkylene groups, and groups of the formulae:

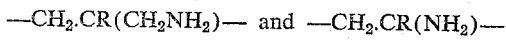

—CH$_2$.CR(CH$_2$NH$_2$)— and —CH$_2$.CR(NH$_2$)— where R is a hydrogen atom or a methyl group. For example, the reduced polymer obtained from a copolymer of acrylonitrile and nitroethylene contains allylamine groups derived by reduction of some of the cyano groups, as well as unreduced cyano groups, and vinylamine groups derived from nitroethylene groups.

Particularly valuable properties as raw materials for the production of fibers are shown by reduced copolymers of acrylonitrile with a relatively small proportion of nitroethylene, which contain (as estimated by reaction with phenyl isothiocyanate and determination of the percentage of sulphur so introduced) 0.025–0.3% by weight of the group —NH$_2$. These polymers therefore contain among the repeating structural units of the molecules, the groups —CH$_2$.CH(CN)—, —CH$_2$.CH(CH$_2$NH$_2$)—, and —CH$_2$.CH(NH$_2$)—, the first mentioned group being present in a molar proportion of at least 80%. From evidence at present available, it appears that these reduced copolymers may be represented substantially by the formula:

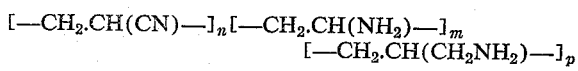

[—CH$_2$.CH(CN)—]$_n$[—CH$_2$.CH(NH$_2$)—]$_m$
[—CH$_2$.CH(CH$_2$NH$_2$)—]$_p$ where $n$ and $m$ are positive integers, $p$ is a positive integer or zero, $n$ is at least 100 times (and preferably 130–400 times, e.g. 150–300 times) $m+p$, and $m$ is greater than $p$. The polymers may however also contain small proportions of other groups e.g. imino groups.

The copolymerisation of the nitroalkene and the acrylonitrile may be effected, under the influence of a free-radical-producing catalyst, in solution, in aqueous emulsion, or in mass. In general, conditions similar to those adopted in the homopolymerisation of acrylonitrile are suitable. Thus, for initiating the polymerisation in aqueous emulsion or suspension it is advantageous to use ammonium persulphate or an alkali metal persulphate, and for initiating the polymerisation in solution or in mass azo-di-isobutyronitrile, although many other substances capable of generating free radicals under appropriate conditions can be employed. Such substances include: hydrogen peroxide; acyl peroxides, e.g. benzoyl peroxide, acetyl peroxide, acetyl benzoyl peroxide and lauryl peroxide; dialkyl peroxides and alkyl hydroperoxides; cyclic-ether peroxides; diazoamino benzene, benzene diazoacetate, benzene diazotriphenyl methane, nitrosoacetanilide and tetraphenylsuccinonitrile. The initiator may be activated by the presence of suitable reducing agents, e.g. sulphur dioxide, sulphites, bisulphites, hypophosphites, and ferrous salts.

We have found that nitroethylene tends to retard the copolymerisation, so that if large initial proportions of this monomer are present difficulty is experienced in obtaining a satisfactory yield of the copolymer, of relatively high average molecular weight, in reasonable time. An indication of the average molecular weight of the copolymer or that of the reduced copolymer can be obtained from the viscosity (measured by the Ostwald method) of a 1% by weight solution in dimethyl formamide. The viscosity of such a solution measured as described will be referred to below as the viscosity of the polymer. When the reduced polymer is intended to be used for fibre formation, its viscosity should be at least 3 cs. Since, during the reduction of the copolymer, a decrease in average molecular weight may occur (probably owing to the degrading action of the hot dimethyl formamide or other reaction medium), the average molecular weight of the unreduced copolymer should be sufficiently high to allow for such a diminution of molecular weight and still give a reduced copolymer having the desired viscosity. Thus, the viscosity of the unreduced copolymer should preferably be substantially above 3 cs., e.g. 4–6 cs., or even higher.

With a view to obtaining the desired high viscosity in the copolymer in a reasonable time, we have found it particularly desirable to start with a high ratio of acrylonitrile to nitroethylene, and in the course of polymerisation gradually to reduce the ratio of total (i.e. polymerised and unpolymerised) acrylonitrile to nitroethylene by addition of further quantities of nitroethylene. Further quantities of acrylonitrile may also be added during the course of polymerisation provided that the proportions are such that the ratio of total acrylonitrile to total nitroethylene is progressively decreased during polymerisation.

We have obtained a particularly valuable series of copolymers by starting with an acrylonitrile:nitroethylene weight ratio between 80:1 and 150:1, and especially between 90:1 and 110:1, and, by gradually adding further quantities of nitroethylene (with or without further addition of acrylonitrile) bringing the total acrylonitrile: nitroethylene ratio to between 10:1 and 30:1, and especially between 18:1 and 22:1. The rate at which the total acrylonitrile:nitroethylene ratio is progressively reduced appears to affect the viscosity of the polymer in that, in general, we have obtained the highest viscosities the more gradual the rate at which this ratio is adjusted, other things being equal. Preferably, therefore, the gradual addition of further quantities of nitroethylene should occupy at least one twentieth of the time allowed for polymerisation, and may with advantage occupy a greater proportion of that time, e.g. one tenth to one quarter, or even one half.

The time allowed for polymerisation will depend on the temperature, nature and concentration of initiator (and of any activator therefor) and on the conversion required. We have obtained the best results at conversions between 30 and 60% with azo-di-isobutyronitrile as the initiator, present to the extent of about 0.3 to 1% of the initial monomer weight, and at temperatures between 60 and 75° C. Under such conditions, the time allowed for polymerisation may range from about 45 minutes to 2½ hours, and the gradual addition of monomer may be spread over 5–30 minutes. Thus, for example, excellent products have been obtained by adding, in the course of 8–12 minutes, one fifth of the initial content of acrylonitrile and five times the initial content of nitroethylene, and separating the copolymer about 1½ hours after the commencement of polymerisation.

The reduction of the acrylonitrile-nitroalkene copolymers to polymers in which some or all of the nitro groups have been converted to primary amine groups may be effected by hydrogenation of a solution of the copolymer, e.g. in dimethyl formamide, with molecular hydrogen under elevated pressure and at elevated temperature in the presence of a catalyst, e.g. Raney nickel.

The following examples, in which all parts and percentages are by weight, illustrate the preparation of polymers according to the invention:

Example 1

The following reaction mixture was heated under reflux in a vessel equipped with a stirrer:

20 parts of acrylonitrile
1 part of nitroethylene
0.2 part of azo-diisobutyronitrile
4 parts of diethyl ether The mixture was heated to 70° C. and maintained at that temperature for 30 mins. during which time the reaction mixture was stirred. The polymer was isolated by filtration, washed and dried. It was in the form of a white amorphous powder which when heated began to discolour at 170° C. The viscosity of a 1% solution in dimethyl formamide at 20° C. was 2.39 cs.

The polymer was then reduced to one containing a small proportion of free $-NH_2$ groups. 4 parts of the polymer were dissolved in 100 parts of dimethyl formamide and the solution placed in a pressure vessel together with one part of Raney nickel and hydrogen under 100 atms. pressure. The pressure vessel was shaken for 2 hours at 80° C., then cooled, the solution filtered and the polymer precipitated by the addition of water or by the addition of an aqueous solution of a salt such as aluminium sulphate.

The precentage of $-NH_2$ in the reduced polymer was then determined as follows:

2.8 parts of phenyl isothiocyanate were dissolved in 40 parts of dimethyl formamide and the solution was heated to 50° C. Then, with stirring, 2 parts of the reduced copolymer dissolved in 40 parts of dimethyl formamide were added dropwise, and the whole heated for a further 2 hours at 60° C. On pouring the solution into 250 parts of ether a tan-coloured precipitate was formed. This was filtered off, washed successively with ether, water and acetone, and dried. The product was then analysed for sulphur content. It was found to contain 0.40% of sulphur. This corresponds to a proportion of $-NH_2$ in the reduced polymer of about 0.20%.

The reduced polymer was of slightly beige colour and when heated began to discolour at 200° C. The viscosity of a 1% solution in dimethyl formamide at 20° C. was 2.30 cs.

Example 2

An acrylonitrile-nitroolefine copolymer was prepared by the process of Example 1 except that the reaction mixture consisted of:

20 parts of acrylonitrile
1 part of nitroethylene
0.2 part of azo-diisobutyronitrile
2.5 parts of diethyl ether and the polymerisation was carried out at 75–80° C. for three hours. The polymer was of slightly buff colour and when heated began to discolour at 190° C. The viscosity of 1% solution in dimethyl formamide at 20° C. was 1.40 cs.

The polymer was then reduced by the hydrogenation process of Example 1 except that the pressure vessel was shaken at 20° C. for 24 hours. The reduced polymer was of buff colour and when heated began to discolour at 220° C.

Example 3

The acrylonitrile-nitroethylene copolymer of Example 2 was reduced by the hydrogenation process of Example 1 except that the pressure vessel was shaken at 90° C. for 2 hours.

Example 4

150 parts of distilled water were placed in a vessel equipped with stirrer and condenser and nitrogen bubbled through. The vessel was then charged with the following reaction mixture:

20 parts of acrylonitrile
1 part of nitroethylene
1 part of sodium secondary octadecyl sulphate
0.3 part of sulphur dioxide (as a 5% aqueous solution)

The mixture was heated for 3 hours at 40–45° C., during which it was stirred. The polymer was isolated by filtration, washed, and dried. It was in the form of a white amorphous powder which when heated began to discolour at 170–180° C. The viscosity of a 1% solution in dimethyl formamide at 20° C. was 2.43 cs.

The polymer was then reduced by the hydrogenation process of Example 1.

Example 5

An acrylonitrile-nitroethylene copolymer was prepared by the process of Example 1 except that the reaction mixture consisted of:

75 parts of acrylonitrile
2.5 parts of nitroethylene
0.3 part of azo-diisobutyronitrile and the polymerisation was carried out at 75–80° C., for 4 hours. The polymer when heated began to discolour at 210° C. The viscosity of a 1% solution in dimethyl formamide at 20° C. was 1.42 cs.

The polymer was then reduced by the hydrogenation process of Example 1 except that the pressure vessel was shaken at 110° C. for 2 hours. The reduced polymer when heated began to discolour at 240° C. The viscosity of a 1% solution in dimethyl formamide at 20° C. was 1.47 cs.

Example 6

An acrylonitrile-nitroethylene copolymer was prepared by the process of Example 1 except that the reaction mixture consisted of:

50 parts of acrylonitrile
0.5 part of nitroethylene
0.2 part of azo-diisobutyronitrile and the polymerisation was carried out at 77–80° C. for 4 hours. The polymer when heated began to discolour at 230° C. The viscosity of a 1% solution in dimethyl formamide at 20° C. was 2.2 cs.

The polymer was then reduced by the hydrogenation process of Example 1 except that the pressure vessel was shaken at 110° C. for 2 hours. The reduced polymer when heated began to discolour at 240° C. The viscosity of a 1% solution in dimethyl formamide at 20° C. was 1.47 cs.

Example 7

The polymerisation was effected in a glass-lined reaction vessel. This was charged with the following reaction mixture:

50 parts of acrylonitrile
0.5 part of nitroethylene
0.20 part of azo-diisobutyronitrile The reaction mixture was raised to a temperature of 64° C. and kept between that temperature and 70° C., and was stirred throughout the polymerisation, which was allowed to continue for 45 minutes. During the first 30 minutes of this period there was added gradually a mixture of 10 parts of acrylonitrile and 2.5 parts of nitroethylene, so bringing the weight-ratio of total acrylonitrile to total nitroethylene to 20:1.

At the end of 45 minutes the solution was removed from the reaction vessel, the polymer filtered off, washed and dried. A sample of the copolymer was obtained, and was dissolved in dimethyl formamide at 20° C. to give a 1% solution. The viscosity of this solution was 9.7 cs.

The remainder of the copolymer was dissolved in dimethyl formamide to give a 4% solution. This was transferred to a stainless-steel pressure vessel, where 1 part of Raney nickel per 100 parts of dimethyl formamide was added, after which hydrogen was charged into the vessel to a pressure of 100 atmospheres at 20° C. The vessel was raised to 90° C. and the charge maintained at that temperature with constant agitation for 2 hours. The solution was filtered free from nickel and was then run into an aqueous aluminium sulphate solution, to precipitate the reduced polymer. This was then filtered off, washed and dried.

Example 8

The process was carried out as in Example 7, except for the differences specified below.

The initial reaction mixture had the following composition:

25 parts of acrylonitrile
0.5 part of nitroethylene
0.2 part of azo-diisobutyronitrile The reaction mixture was heated to 65° C. and kept between that temperature and 75° C. throughout the polymerisation.

There was added to the initial reaction mixture gradually, throughout the first 20 minutes of the reaction, 5 parts of acrylonitrile and 1.1 parts of nitroethylene, so bringing the ratio of total acrylonitrile to total nitroethylene to 18.7:1.

The viscosity of a 1% solution of the copolymer in dimethyl formamide at 20° C. was 6.4 cs.

A sample of the reduced polymer was dissolved in dimethyl formamide to give a 1% solution. The viscosity of this solution at 20° C. was 4 cs.

When the washed, dried, reduced copolymer was gradually heated in air, discolouration occurred at a temperature of 220° C.

Example 9

The process was carried out as in Example 7, except for the differences specified below.

The composition of the initial reaction mixture was as follows:

50 parts of acrylonitrile
0.25 part of nitroethylene
0.2 part of azo-diisobutyronitrile The temperature was kept between 66 and 70° C.

Polymerisation was allowed to continue for 2 hours, during the first 3 minutes of which an addition of 10 parts of acrylonitrile and 1.2 parts of nitroethylene was made, thus bringing the ratio of total acrylonitrile to total nitroethylene to approximately 40:1.

The viscosity of a 1% solution of the copolymer in dimethyl formamide at 20° C. was 6.3 cs.

By the method described in Example 1, the proportion of —$NH_2$ in the reduced polymer was estimated at 0.05%.

The temperature at which discolouration occurred on heating the reduced copolymer in air was 220° C.

Example 10

The process was carried out as in Example 7, except for the differences specified below.

The initial reaction mixture had the following composition:

25 parts of acrylonitrile
0.25 part of nitroethylene
0.2 part of azo-diisobutyronitrile The temperature during polymerisation was maintained between 64 and 70° C.

Polymerisation was allowed to continue for 1½ hours, during the first ten minutes of which there were gradually added 5 parts of acrylonitrile and 1.25 parts of nitroethylene.

By the method described in Example 1, the proportion of —$NH_2$ in the reduced polymer was estimated at 0.06%.

The viscosity of a 1% solution of the copolymer in dimethyl formamide at 20° C. was 4.8 cs.

The viscosity of a solution of the same concentration of the reduced copolymer was 3.4 cs.

The temperature at which discolouration of the reduced copolymer occurred on heating was 220° C.

The products of all these examples gave good fibre-forming solutions in dimethyl formamide and the fibres formed therefrom showed good affinity for acid and direct cotton dyes.

Examples 7–10 show how the employment of the technique of gradually adding the nitroethylene to the polymerising mixture results in the production of polymers of higher viscosities.

In a similar way other nitroalkenes of the kind referred to above can be copolymerised with acrylonitrile or other unsaturated nitriles having the formula:

$$CH_2=C(X)CN$$

where X equals H, methyl, or an electronegative element or group (by an electronegative element or group is meant one such that the compound contained in it has a higher dipole moment than a similar compound in which said element or group is replaced by hydrogen). Among such olefinic nitriles are methacrylonitrile, methylene malononitrile and itaconic acid nitrile. A mixture of two or more such nitriles may also be employed, e.g. a mixture of acrylonitrile and methacrylonitrile.

The invention also includes graft copolymers of lower aliphatic unsaturated nitriles and lower aliphatic nitroalkenes and reduction products of these polymers containing free —NH$_2$ groups. Such graft copolymers may be obtained, for instance, by the action of suitable nitroalkene radicals on already formed polyalkylene nitriles or of suitable unsaturated nitrile radicals on polynitroalkenes.

Useful copolymers can also be obtained by copolymerising nitroalkenes with monomers having the formula: CH$_2$=C(X)Y where Y is an electronegative substituent other than —CH or —NO$_2$. Examples of such monomers are: styrene, vinyl chloride, vinylidene chloride, vinyl acetate, acrylic acid, methacrylic acid, methyl methacrylate, ethyl acrylate, vinyl pyridines, N-vinyl carbazole, N-vinyl pyrrolidone, acrylamide, methacrylamide. Instead of monoolefinic unsaturated compounds, diolefinic unsaturated compounds may be copolymerised with the nitroalkene. Examples of compounds containing conjugated olefinic unsaturation which may be mentioned in this connection are: butadiene, chloroprene, and isoprene. Unconjugated diolefinic compounds, e.g. diallyl phthalate, can also be employed.

Filaments can be obtained from the fibre-forming copolymers of the invention by wet spinning, dry spinning, or melt spinning according to the solubility properties and softening point of the particular copolymer. The copolymers which we have found of most value for this purpose are those containing a high proportion of acrylonitrile. Such copolymers are in general soluble in the same solvents as polyacrylonitrile, e.g. in dimethyl formamide, ethylene carbonate, sulpholane and concentrated aqueous solutions of nitromethane. Thus, for example, from the reduced copolymer of Example 1 a yarn was made by wet spinning a dimethyl formamide solution of the copolymer into a coagulating bath of water. The yarn showed good affinity for direct cotton dyes, e.g. Chlorazol Pink B.K., and for acid dyes, e.g. Fast Red A. and Coumassie Blue.

From filamentary materials having a basis of the polymers of the invention, whether composed of continuous filaments or staple fibres, fabrics, e.g. woven, knitted or felted fabrics, can be made. The invention includes the use of filamentary material of the copolymers in admixture with other filamentary materials e.g. cotton, wool, silk and synthetic fibres, e.g. those having a basis of regenerated cellulose, cellulose esters, nylons, polyethylene terephthalate, poly-4-amino-1,2,4-triazoles, polyacrylonitrile and copolymers of acrylonitrile with vinyl chloride and with vinylidene chloride and of vinyl chloride with vinylidene chloride. In such mixed textile materials advantage may be taken of the special dye affinity of the copolymers of the invention to produce useful cross-dyeing effects.

In addition to textile products, other products can be fabricated from the copolymers of the invention. Thus, for example, films may be made from solutions of the copolymers by the evaporative method or by wet casting. From thermoplastic copolymers of the invention moulded and extruded products can be made.

Filaments made from the copolymers of the invention can be oriented by stretching, e.g. in steam or hot water, or in a dry heat softened condition, to give products of high tenacity. The stretched filamentary materials may be stabilised against shrinkage due to exposure in use to elevated temperatures, by a heat treatment carried out at a higher temperature than any to which the material will be exposed in normal use. The heat softening point and resistance to swelling by water and organic liquids of the copolymers of the invention can be increased by chemical treatments designed to cross-link the polymer chains by virtue of the replaceable hydrogen in the primary amine groups. Suitable cross-linking agents include phthalic anhydride, adipic acid and other dicarboxylic acids and anhydrides, di- and poly-isocyanates and aldehydes such as formaldehyde and glyoxal.

Having described our invention, what we desire to secure by Letters Patent is:

1. A polymer of formula:

[—CH$_2$.CH(CN)—]$_n$[—CH$_2$.CH(NH$_2$)—]$_m$
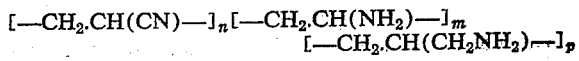
[—CH$_2$.CH(CH$_2$NH$_2$)—]$_p$ where $n$ and $m$ are positive integers, $p$ is selected from the group consisting of positive integers and zero, $n$ is at least 100 times $m+p$ and $m$ is greater than $p$, said polymer containing 0.025–0.3% by weight of free —NH$_2$ groups.

2. Textile material containing fibres of polymeric material according to claim 1.

3. Process for the production of polymers containing free —NH$_2$ groups, which comprises copolymerising acrylonitrile, present in a molar proportion of at least 80%, with nitro-ethylene in the presence of a free-radical-producing polymerisation initiator, the ratio by weight of total acrylonitrile:nitro-ethylene at the commencement of the polymerisation being between 80:1 and 150:1, reducing said ratio gradually during the polymerisation to between 20:1 and 30:1, thereafter completing the copolymerization, and reducing the resulting copolymer by catalytic reduction with hydrogen in the presence of a metallic hydrogenation catalyst suspended in a liquid medium in which the polymer to be reduced is dissolved.

4. Process according to claim 3, wherein the said ratio is reduced from between 90:1 and 110:1 to between 18:1 and 22:1 within a time not greater than half the time of the polymerisation.

5. Process according to claim 3, in which the liquid medium is dimethyl formamide.

References Cited in the file of this patent

UNITED STATES PATENTS 2,662,877    Chaney _____ Dec. 15, 1953

OTHER REFERENCES

Journal of Am. Chem. Soc., volume 67, September 1945. Article by Bloomquist et al., pages 1519–1524.